(12) United States Patent
Sonokawa et al.

(10) Patent No.: US 11,371,373 B2
(45) Date of Patent: Jun. 28, 2022

(54) SEAL ASSEMBLY FOR USE IN GAS TURBINE ENGINES

(71) Applicant: UNITED TECHNOLOGIES CORPORATION, Farmington, CT (US)

(72) Inventors: Masayoshi Sonokawa, West Hartford, CT (US); Jonathan F. Zimmitti, Glastonbury, CT (US); Nasr A. Shuaib, Watertown, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 147 days.

(21) Appl. No.: 16/666,890

(22) Filed: Oct. 29, 2019

(65) Prior Publication Data
US 2021/0123357 A1    Apr. 29, 2021

(51) Int. Cl.
| | |
|---|---|
| F01D 11/00 | (2006.01) |
| F02C 7/28 | (2006.01) |
| F01D 25/18 | (2006.01) |
| F02C 7/06 | (2006.01) |
| F04D 29/10 | (2006.01) |
| F16J 15/30 | (2006.01) |

(52) U.S. Cl.
CPC .......... *F01D 11/003* (2013.01); *F01D 25/183* (2013.01); *F02C 7/06* (2013.01); *F02C 7/28* (2013.01); *F04D 29/102* (2013.01); *F05D 2220/323* (2013.01); *F05D 2240/55* (2013.01); *F05D 2240/60* (2013.01); *F16J 15/30* (2013.01)

(58) Field of Classification Search
CPC .......... F16J 15/30; F16J 15/34; F16J 15/3464; F16J 15/348; F01D 11/003; F01D 25/183; F02C 7/06; F02C 7/28; F04D 29/102; F05D 2220/323; F05D 2240/55; F05D 2240/60
See application file for complete search history.

(56) References Cited

U.S. PATENT DOCUMENTS

| | | | | |
|---|---|---|---|---|
| 3,689,083 | A * | 9/1972 | Greenawalt | F16J 15/38 277/372 |
| 3,784,213 | A | 1/1974 | Voitik | |
| 6,679,678 | B2 * | 1/2004 | Giesler | F01D 11/00 277/372 |
| 7,311,307 | B2 * | 12/2007 | Dahlheimer | F16J 15/38 277/370 |
| 8,485,530 | B2 * | 7/2013 | Johansson | F16J 15/348 277/373 |
| 9,109,515 | B2 | 8/2015 | Haynes | |
| 2002/0041070 | A1 | 4/2002 | Tran et al. | |

(Continued)

FOREIGN PATENT DOCUMENTS

EP    3447251    2/2019

OTHER PUBLICATIONS

European Patent Office, European Search Report dated Jan. 29, 2021 in Application No. 20202836.1.

*Primary Examiner* — Gilbert Y Lee
(74) *Attorney, Agent, or Firm* — Snell & Wilmer L.L.P.

(57) ABSTRACT

A seal housing may comprise an aft flange, an outer diameter (OD) ring and a stopper. The stopper may extend radially inward from a radially inner surface of OD ring. The stopper may be configured to interface with a monobloc carbon seal. The stopper may comprise a circumferential stopping portion and an axial stopping portion. There may be a plurality of the stopper.

18 Claims, 5 Drawing Sheets

(56) References Cited

U.S. PATENT DOCUMENTS

| | | |
|---|---|---|
| 2002/0180156 A1 | 12/2002 | Tran et al. |
| 2010/0283209 A1 | 11/2010 | Vanderzyden |
| 2012/0319355 A1* | 12/2012 | Blewett .................. F16J 15/348 |
| | | 277/372 |
| 2016/0010483 A1 | 1/2016 | Miller |
| 2019/0249605 A1 | 8/2019 | Amador et al. |

* cited by examiner

SEAL ASSEMBLY FOR USE IN GAS TURBINE ENGINES

FIELD

The present disclosure relates to face seals and, more particularly, to monobloc face seals for a main shaft bearing compartment of a gas turbine engine.

BACKGROUND

Seal assemblies for main shaft bearing compartments of gas turbine engines take up design space that may be utilized for other components. Typical face seals may have high spring loads leading to high seal contact pressure and greater heat generation, resulting in higher seal wear and decreased seal life.

SUMMARY

A seal housing for a seal assembly is disclosed herein. The seal housing may comprise: an aft flange; an outer diameter (OD) ring coupled to the aft flange, the OD ring disposed forward of the aft flange and comprising a radially inner surface; and a stopper extending radially inward from the radially inner surface of the OD ring, the stopper configured to interface with a monobloc seal of the seal assembly.

In various embodiments, the stopper further comprises a circumferential stopper portion and an axial stopper portion. The circumferential stopper portion may include a circumferential stopping surface extending from the radially inner surface of the OD ring to a stopper radially inner surface of the stopper. The axial stopper portion may extend circumferentially from the circumferential stopper portion. The OD ring may comprise an aft axial surface, and the axial stopper portion may be disposed aft of the aft axial surface of the OD ring. The circumferential stopper portion may be configured to restrain a circumferential movement of the monobloc seal during operation of a gas-turbine engine. The axial stopper portion may be configured to restrain an axial movement of the monobloc seal during seal assembly.

A seal assembly for use in a main bearing shaft compartment of a gas-turbine engine is disclosed herein. The seal assembly may comprise: a seal housing comprising: an aft flange; an outer diameter (OD) ring coupled to the aft flange, the OD ring disposed forward of the aft flange and comprising a radially inner surface; and a stopper extending radially inward from the radially inner surface of the OD ring, the stopper; a monobloc seal disposed radially inward of the OD ring; and a secondary seal disposed radially inward of the monobloc seal.

In various embodiments, the stopper further comprises a circumferential stopper portion and an axial stopper portion, and wherein the monobloc seal further comprises a radial protrusion and a main body, the radial protrusion extending radially outward from the main body and configured to interface with the circumferential stopper portion and the axial stopper portion. The circumferential stopper portion may include a circumferential stopping surface extending from the radially inner surface of the OD ring to a stopper radially inner surface of the stopper.

In various embodiments, the axial stopper portion may extend circumferentially from the circumferential stopper portion. The OD ring may comprise an aft axial surface, and the axial stopper portion may be disposed aft of the aft axial surface of the OD ring. The circumferential stopper portion may be configured to restrain a circumferential movement of the monobloc seal. The axial stopper portion may be configured to restrain an axial movement of the monobloc seal.

A gas-turbine engine is disclosed herein. The gas-turbine engine may comprise: a main shaft bearing compartment comprising: a seal housing comprising: an aft flange; an outer diameter (OD) ring coupled to the aft flange, the OD ring disposed forward of the aft flange and comprising a radially inner surface; and a stopper extending radially inward from the radially inner surface of the OD ring, the stopper; a monobloc seal comprising a nose, the monobloc seal disposed radially inward of the OD ring, the nose configured to interface with a seal seat of a shaft for rotation about a central longitudinal axis of the gas-turbine engine; and a secondary seal disposed radially inward of the monobloc seal.

In various embodiments, the stopper may further comprise a circumferential stopper portion and an axial stopper portion, and the monobloc seal may further comprise a radial protrusion and a main body, the radial protrusion extending radially outward from the main body and configured to interface with the circumferential stopper portion and the axial stopper portion. The circumferential stopper portion may include a circumferential stopping surface extending from the radially inner surface of the OD ring to a stopper radially inner surface of the stopper. The axial stopper portion may extend circumferentially from the circumferential stopper portion. The OD ring may comprise an aft axial surface, and wherein the axial stopper portion is disposed aft of the aft axial surface of the OD ring. The circumferential stopper portion may be configured to restrain a circumferential movement of the monobloc seal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, towards the axis of rotation of a turbine engine. Although depicted as being aligned in a certain direction, a seal assembly aligned in either axial direction is within the scope of this disclosure.

Figure 1:
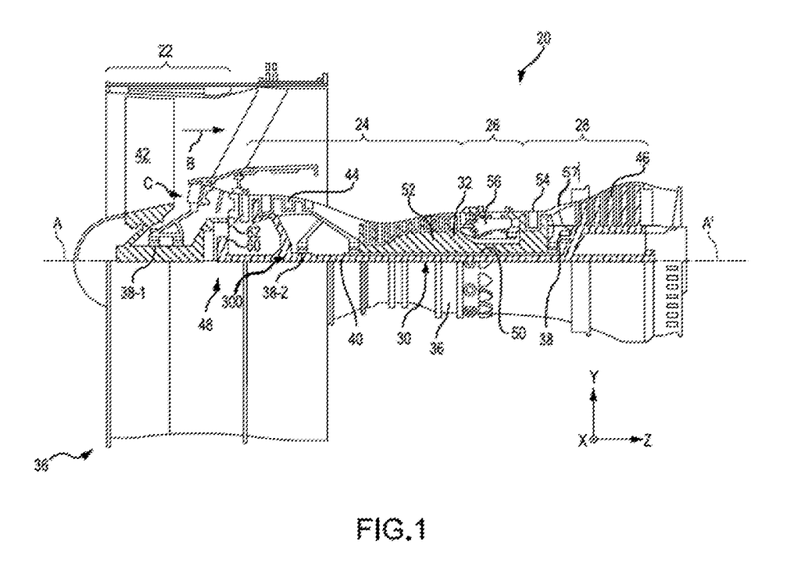
FIG. 1 illustrates a cross-sectional view of a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Figure 2:
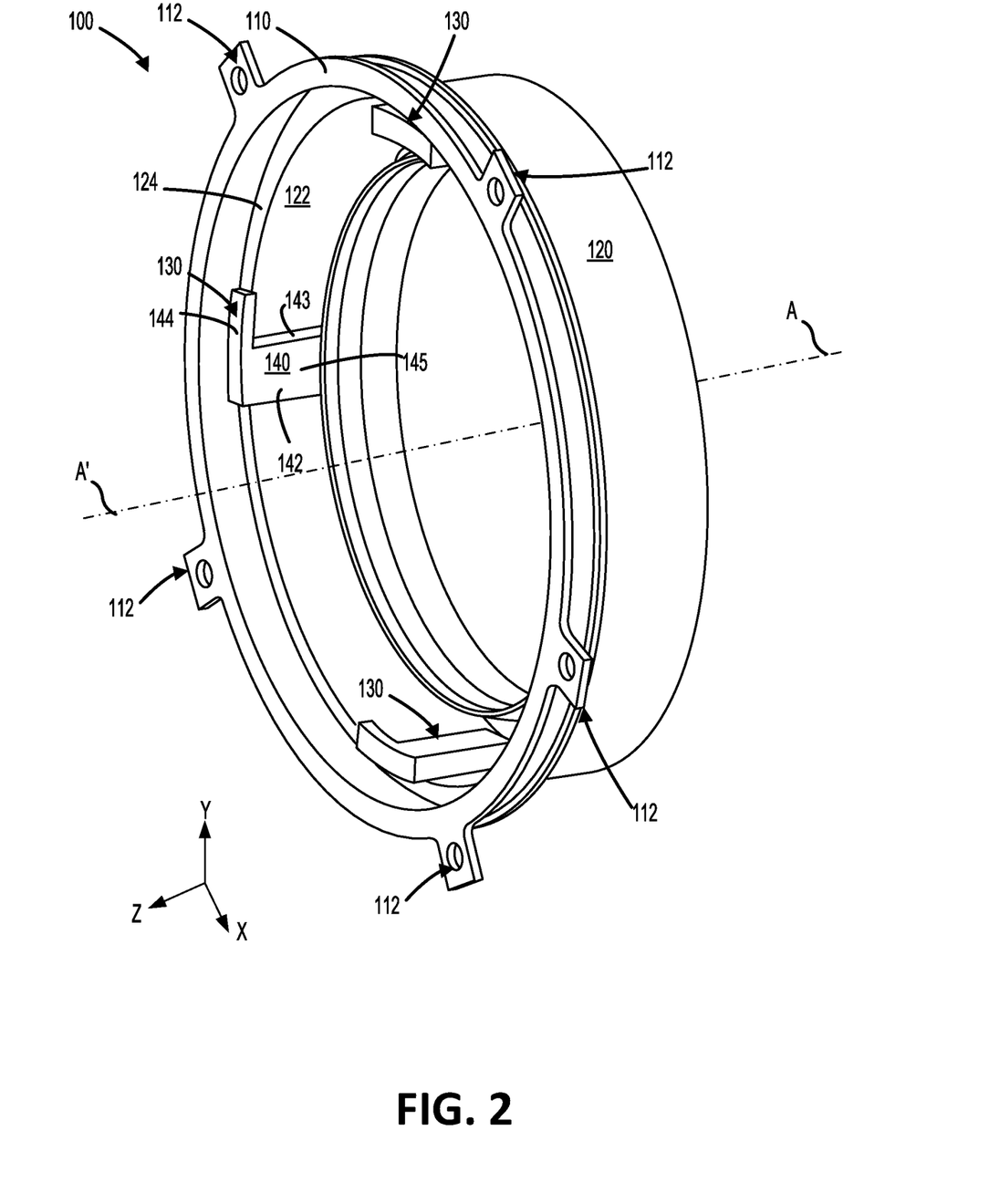
FIG. 2 illustrates a perspective view of a seal housing, in accordance with various embodiments.

With reference to FIG. 2, a perspective view of a seal housing 100 is illustrated, according to various embodiments. Seal housing 100 may be formed from a metallic material, for example, aluminum, titanium, nickel, steel, and alloys including any of the preceding metals. Seal housing 100 may be an annular, static structure disposed in a main bearing shaft compartment, such as bearing shaft compartment 300 of engine 20 (FIG. 1). Stated another way, seal housing 100 may be a non-rotating structure disposed around inner shaft 40 or outer shaft 50 of engine 20. As described in further detail below, seal housing 100 may be configured to provide a housing for a monobloc seal to interface with rotating equipment in the main bearing shaft compartment, such as bearing shaft compartment 300.

Seal housing 100 may include a mating flange 110, an outer diameter (OD) ring 120, and a plurality of stoppers 130. In various embodiments, mating flange 110 comprises a plurality of tabs 112, each tab in the plurality of tabs having an aperture configured to mate the seal housing 100 to an adjacent component in a main bearing shaft compartment, such as bearing shaft compartment 300 of engine 20 (FIG. 1). The OD ring 120 may be disposed forward of mating flange 110. OD ring 120 and mating flange 110 may each be annular structures disposed about engine central longitudinal axis A-A'.

Figure 3:
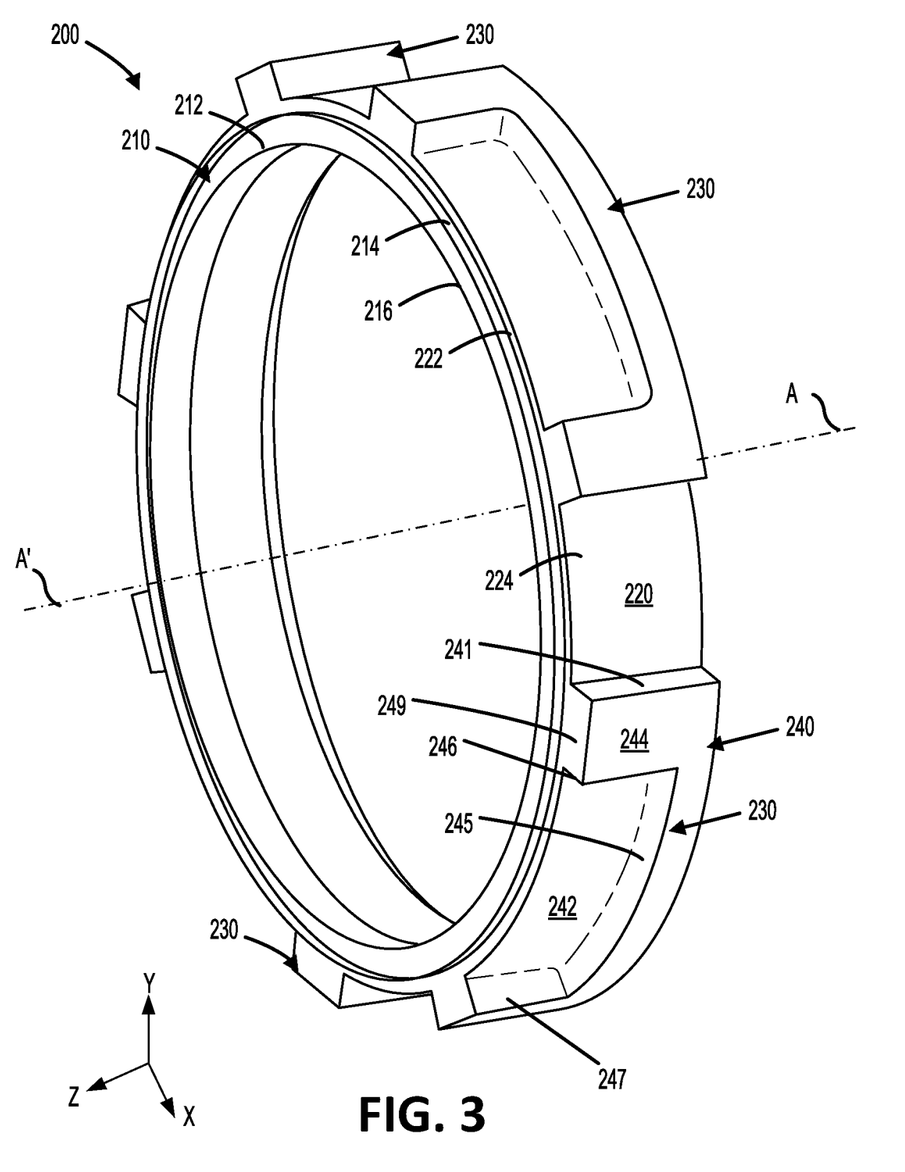
FIG. 3 illustrates a perspective view of a monobloc seal, in accordance with various embodiments.

In various embodiments, the plurality of stoppers 130 are disposed circumferentially about OD ring 120. Each stopper in the plurality of stoppers extends radially inward from a radially inner surface 122 of OD ring 120. Each stopper in the plurality of stoppers 130 comprises a circumferential stopper portion and an axial stopper portion. For example, a first stopper 140 in the plurality of stoppers 130 comprises a circumferential stopper portion 142 and an axial stopper portion 144. Circumferential stopper portion 142 may be configured to prevent motion of a monobloc seal 200 (as shown in FIG. 3) in a circumferential direction during operation of the gas-turbine engine. Axial stopper portion 144 may prevent axial motion of a mating monobloc seal in an axial direction during assembly of a seal assembly of a gas-turbine engine.

In various embodiments, the circumferential stopper portion 142 comprises a circumferential stopping surface 143. Circumferential stopping surface 143 extends radially inward from radially inner surface 122 of OD ring 120 to a stopper radially inner surface 145. In various embodiments, the axial stopper portion 144 extends circumferentially about axis A-A' from circumferential stopping surface 143. The axial stopper portion 144 may be disposed at an aft end of first stopper 140. In various embodiments, axial stopper portion 144 may be disposed aft of an aft axial surface 124 of OD ring 120.

By disposing the plurality of stoppers 130 radially inward from OD ring 120, a design space in the main bearing shaft compartment, such as main bearing shaft compartment 300 (from FIG. 1) may be reduced. With a reduced seal design space, a design space of the main bearing shaft compartment, such as main bearing shaft compartment 300, may be reduced and/or a design space of an engine overall size and weight may be reduced. Component size reduction inside of the engine typically affects the size of external engine component part. As such, reduction of weight in the seal assembly, as well as external components may be achieved and/or greater structural integrity, or the like. A seal axial contact load may be reduced due to a decrease in weight of a monobloc seal 200 (as shown in FIG. 3) configured to mate with the seal housing 100.

Referring now to FIG. 3, a perspective view of a monobloc seal 200, in accordance with various embodiments, is illustrated. The monobloc seal 200 may comprise a carbon seal, for example, monobloc seal 200 may comprise graphite or electro-graphite. Monobloc seal 200 may be an annular, static structure disposed in a main bearing shaft compartment, such as main bearing compartment 300 of engine 20 (FIG. 1). Stated another way, monobloc seal 200 may be a non-rotating structure disposed around inner shaft 40 or outer shaft 50 of engine 20. As described in further detail below, monobloc seal 200 may be configured to interface with rotating equipment in the main bearing shaft compartment, such as main bearing compartment 300. For instance, a fluid-tight seal may be created to limit fluid (e.g. air) leakage in and out the main bearing shaft compartment 300.

Monobloc seal 200 may comprise a nose 210, a main body 220, and a plurality of radial protrusions 230. Nose 210 of monobloc seal 200 may extend aft from main body 220. Nose 210 may be defined, at least partially, by an axial surface 212 of monobloc seal 200, a distal radial surface 214 extending aft from an axial surface 222 of main body 220, and proximal radial surface 216 of monobloc seal 200 disposed radially inward from distal radial surface 214.

Main body 220 may further comprise a radially outer surface 224. Each radial protrusion in the plurality of radial protrusions 230 may extend radially outward from radially outer surface 224. Each radial protrusion in the plurality of radial protrusions may be partially defined by a circumferential stopper mating surface and an axial stopper mating surface. For example, radial protrusion 240 is partially defined by circumferential stopper mating surface 241 and axial stopper mating surface 249.

Each radial protrusion in the plurality of radial protrusions 230 may comprise a recess. For example, radial protrusion 240 in the plurality of radial protrusions 230 comprises a recess 242 extending from a radially outer surface 244 of radial protrusion 240 to approximately radially outer surface 224 of main body 220. Each recess may be partially defined by an axial surface of each protrusion, a first circumferential surface of each protrusion, and a second circumferential surface of each protrusion. For example, recess 242 may be partially defined by axial surface 245 of radial protrusion 240. Axial surface 245 of radial protrusion 240 may be disposed forward of a axial surface 222 of main body 220 and radially outward of main body 220. Recess 242 may be partially defined by a first circumferential surface 246 of radial protrusion 240 and a second circumferential surface 247 of radial protrusion 240 disposed circumferentially opposite first circumferential surface 246. The plurality of recesses 242 may reduce weight of the monobloc seal 200 while maintaining a sufficient material strength and/or circumferential stopper mating surface 241. In various embodiments, a number of protrusions in the plurality of radial protrusions 230 may correspond to a number of stoppers in the plurality of stoppers 130 for a given seal assembly.

Figure 4:
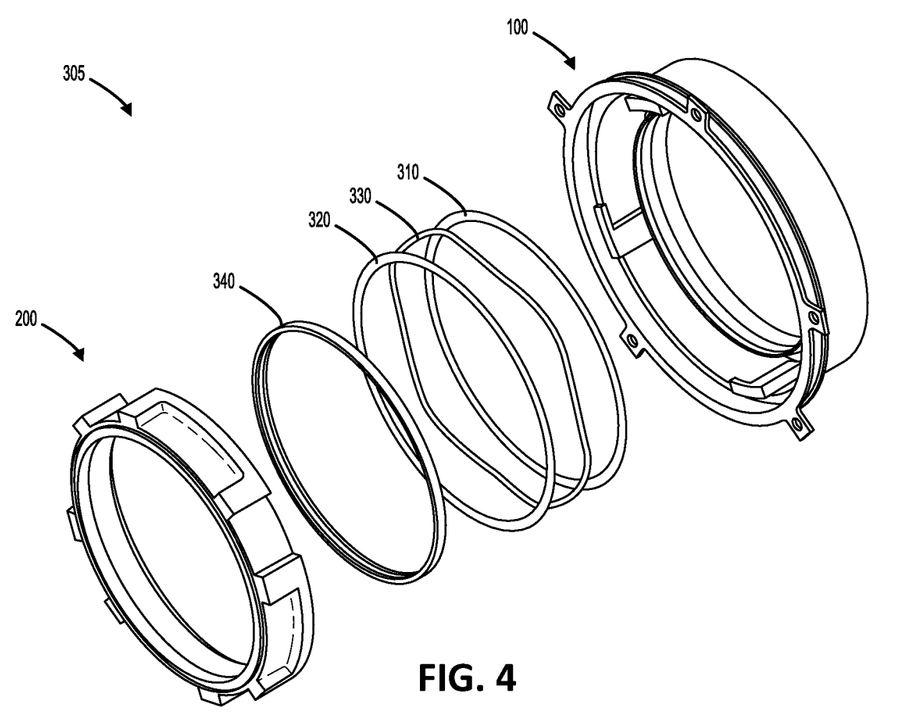
FIG. 4 illustrates an exploded view of a seal assembly, in accordance with various embodiments.

Referring now to FIG. 4, an exploded view of a seal assembly 305, in accordance with various embodiments, is illustrated. The seal assembly 305 comprises a seal housing 100, a monobloc seal 200, a first washer 310, a second washer 320, a spring 330, and a secondary seal 340. The spring 330 may comprise a wave spring as illustrated. The spring 330 may be disposed between first washer 310 and second washer 320.

Figure 5:
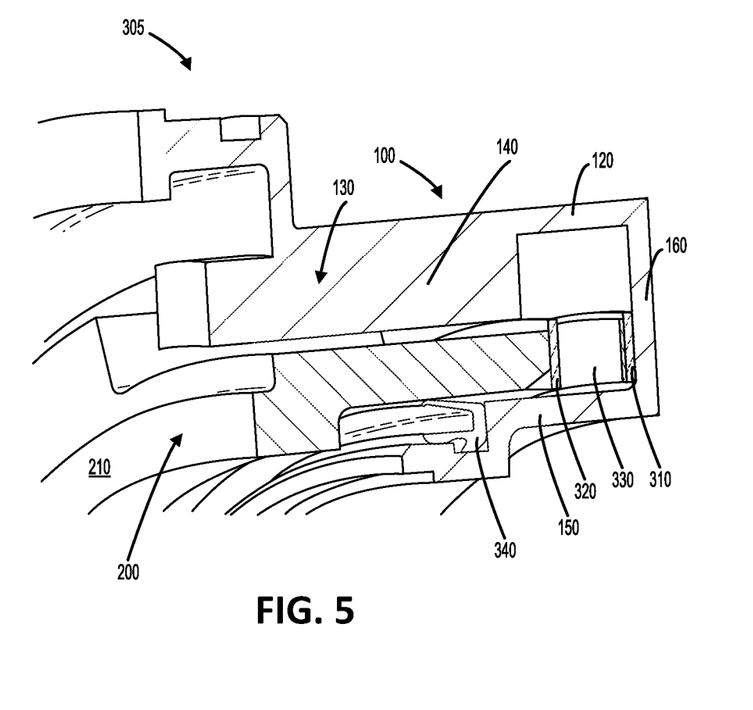
FIG. 5 illustrates a perspective cross-sectional view of a seal assembly in an assembled position, in accordance with various embodiments.

Referring now to FIG. 5, a perspective cross-sectional view of a seal assembly 305 in an assembled position, in accordance with various embodiments, is illustrated. In various embodiments, seal housing 100 further comprises an inner diameter (ID) ring 150 and a forward wall 160. The forward wall 160 may be an axial wall and extend from a forward end of ID ring 150 to a forward end of OD ring 120.

As such, the seal housing 100 may at least partially enclose the monobloc seal 200, first washer 310, second washer 320, spring 330, and secondary seal 340. In various embodiments, spring 330 may apply a force or spring load against a surface of forward wall 160 of seal housing 100 to bias monobloc seal 200 in an aft direction. In various embodiments, forward wall 160 may be separated axially from each stopper in the plurality of stoppers 130, which may reduce weight of the seal assembly. In various embodiments, seal housing the plurality of stoppers 130 are integral with OD ring 120 (i.e., seal housing 100 is a monolithic component). In various embodiments, the plurality of stoppers 130 may be individual components configured to be coupled to the seal housing 100.

In various embodiments, seal housing 100 may be disposed about inner shaft 40 (from FIG. 1). Monobloc seal 200 may contact and form a fluid tight seal or "sealing interface" with a seal seat. In that regard, monobloc seal 200 may reduce air leakage into main bearing shaft compartment 300 (from FIG. 1).

In various embodiments, with reference to FIGS. 2 and 5, by disposing the plurality of stoppers 130 within radially inward from OD ring 120, a weight of the seal housing 100 and the monobloc seal 200 may be reduced. As such, a spring force on spring 330 may also be reduced and/or increase seal life. Additionally, the seal assembly 305 may be a more compact design allowing for reduced main bearing shaft compartment design space.

With reference now to FIGS. 2, 3, and 5, during operation of the gas-turbine engine, a circumferential stopper portion of each stopper in the plurality of stoppers 130 may interface with, and restrain a circumferential movement of, a respective circumferential stopper mating surface of monobloc seal 200. During operation of the gas-turbine engine, an axial stopper portion of each stopper in the plurality of stoppers 130 may not interface with a respective axial stopper mating surface of each protrusion in the plurality of radial protrusions of monobloc seal 200.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal housing for a seal assembly, the seal housing comprising:
   an aft flange;
   a forward wall spaced apart axially from the aft flange;
   an outer diameter (OD) ring coupled to the aft flange, the OD ring disposed forward of the aft flange and comprising a radially inner surface;
   an inner diameter ring (ID) ring spaced apart radially from the OD ring, the ID ring extending axially aft from the forward wall; and
   a stopper extending radially inward from the radially inner surface of the OD ring, the stopper configured to interface with a monobloc seal of the seal assembly, the stopper disposed radially outward from the ID ring, the stopper spaced apart axially from the forward wall, wherein:
   the stopper further comprises a circumferential stopper portion and an axial stopper portion,
   the circumferential stopper portion is configured to restrain a circumferential movement of the monobloc seal during operation of a gas-turbine engine, and
   the axial stopper portion is configured to restrain an axial movement of the monobloc seal during an assembly of the seal assembly.

2. The seal housing of claim 1, wherein the circumferential stopper portion includes a circumferential stopping surface extending from the radially inner surface of the OD ring to a stopper radially inner surface of the stopper.

3. The seal housing of claim 2, wherein the axial stopper portion extends circumferentially from the circumferential stopper portion.

4. The seal housing of claim 3, wherein the OD ring comprises an aft axial surface, and wherein the axial stopper portion is disposed aft of the aft axial surface of the OD ring.

5. The seal housing of claim 1, wherein the seal housing is monolithic.

6. A seal assembly for use in a main bearing shaft compartment of a gas-turbine engine, the seal assembly comprising:
   a seal housing comprising:
      an aft flange;
      a forward wall spaced apart axially from the aft flange;
      an outer diameter (OD) ring coupled to the aft flange, the OD ring disposed forward of the aft flange and comprising a radially inner surface;
      an inner diameter ring (ID) ring spaced apart radially from the OD ring, the ID ring extending axially aft from the forward wall; and
      a stopper extending radially inward from the radially inner surface of the OD ring, the stopper, wherein:
      the stopper is configured to restrain a circumferential movement of the monobloc seal, and
      the stopper is configured to restrain an axial movement of the monobloc seal;
   a monobloc seal disposed radially inward of the OD ring; and
   a secondary seal disposed radially inward of the monobloc seal.

7. The seal assembly of claim 6, wherein the stopper further comprises a circumferential stopper portion and an axial stopper portion, and wherein the monobloc seal further comprises a radial protrusion and a main body, the radial protrusion extending radially outward from the main body and configured to interface with the circumferential stopper portion and the axial stopper portion.

8. The seal assembly of claim 7, wherein the circumferential stopper portion includes a circumferential stopping surface extending from the radially inner surface of the OD ring to a stopper radially inner surface of the stopper.

9. The seal assembly of claim 8, wherein the axial stopper portion extends circumferentially from the circumferential stopper portion.

10. The seal assembly of claim 9, wherein the OD ring comprises an aft axial surface, and wherein the axial stopper portion is disposed aft of the aft axial surface of the OD ring.

11. The seal assembly of claim 6, wherein the seal housing is monolithic.

12. A gas-turbine engine, comprising:
    a main shaft bearing compartment comprising:
       a seal housing comprising:
          an aft flange;
          a forward wall spaced apart axially from the aft flange;
       an outer diameter (OD) ring coupled to the aft flange, the OD ring disposed forward of the aft flange and comprising a radially inner surface;
       an inner diameter ring (ID) ring spaced apart radially from the OD ring, the ID ring extending axially aft from the forward wall; and
       a stopper extending radially inward from the radially inner surface of the OD ring, the stopper, wherein:
       the stopper is configured to restrain a circumferential movement of the monobloc seal, and the stopper is configured to restrain an axial movement of the monobloc seal;
          a monobloc seal comprising a nose, the monobloc seal disposed radially inward of the OD ring, the nose configured to interface with a seal seat of a shaft for rotation about a central longitudinal axis of the gas-turbine engine; and
          a secondary seal disposed radially inward of the monobloc seal.

13. The gas-turbine engine of claim 12, wherein the stopper further comprises a circumferential stopper portion and an axial stopper portion, and wherein the monobloc seal further comprises a radial protrusion and a main body, the radial protrusion extending radially outward from the main body and configured to interface with the circumferential stopper portion and the axial stopper portion.

14. The gas-turbine engine of claim 13, wherein the circumferential stopper portion includes a circumferential stopping surface extending from the radially inner surface of the OD ring to a stopper radially inner surface of the stopper.

15. The gas-turbine engine of claim 14, wherein the axial stopper portion extends circumferentially from the circumferential stopper portion.

16. The gas-turbine engine of claim 15, wherein the OD ring comprises an aft axial surface, and wherein the axial stopper portion is disposed aft of the aft axial surface of the OD ring.

17. The gas-turbine engine of claim 13, wherein the circumferential stopper portion is configured to restrain the circumferential movement of the monobloc seal during operation of the gas-turbine engine.

18. The gas-turbine engine of claim 12, wherein the seal housing is monolithic.

\* \* \* \* \*